(12) United States Patent
Holyoak

(10) Patent No.: US 6,341,577 B1
(45) Date of Patent: Jan. 29, 2002

(54) APPARATUS AND METHOD FOR FEEDING FROGS CULTIVATED IN CAPTIVITY

(76) Inventor: H. Kenneth Holyoak, Hwy. 129 North, Alapaha, GA (US) 31622

( * ) Notice: Subject to any disclaimer, the term of this patent is extended or adjusted under 35 U.S.C. 154(b) by 0 days.

(21) Appl. No.: 09/469,021

(22) Filed: Dec. 21, 1999

(51) Int. Cl.⁷ .................................................. A01K 1/10
(52) U.S. Cl. ................................................... 119/57.92
(58) Field of Search ........................... 119/51.01, 51.04, 119/57.92, 51.11

(56) References Cited

U.S. PATENT DOCUMENTS

| | | | |
|---|---|---|---|
| 4,019,459 A | * 4/1977 | Neff | 119/51 R |
| 4,027,627 A | * 6/1977 | Fillion | 119/51.11 |
| 4,038,947 A | 8/1977 | Lester, Jr. | |
| 4,130,089 A | * 12/1978 | Moran | 119/51 R |
| 4,347,808 A | 9/1982 | Lester | |
| 5,873,327 A | 2/1999 | Holyoak | |

* cited by examiner

*Primary Examiner*—Thomas Price
(74) *Attorney, Agent, or Firm*—Robert L. Wolter, Esq.; Beusse, Brownlee, Bowdoin & Wolter, P.A.

(57) ABSTRACT

The apparatus includes a plurality of containers, within which frogs are cultivated, supported in vertically spaced tires on an upright rack. A plurality of feed trays are provided wherein a feed tray is provided for each container. Artificial feed, in the form of a plurality of pellets, or discrete feed particles, are supplied in the feed tray.

An air suction system is utilized for engagement of the discrete particles. Air is drawn through a feed engagement member so a suction force is created at the tip of the feed engagement member to engage pellets. The feed engagement member is actuated toward the feed tray to engage the pellets. Then the feed engagement member is actuated to the interior of the container where the frogs take the pellets off of the feed engagement member.

The air flow direction can, in the air suction system, also be reversed so air is blown out through the feed engagement member in order to clean the same and any conduits or lines leading to the feed engagement member.

35 Claims, 8 Drawing Sheets

APPARATUS AND METHOD FOR FEEDING FROGS CULTIVATED IN CAPTIVITY

FIELD OF THE INVENTION

This apparatus and method relates in general to the commercial cultivation of frogs in a controlled environment. More particularly, the invention relates to a method and apparatus for feeding frogs in a man-made climate-controlled environment.

BACKGROUND OF THE INVENTION

The cultivation of frogs in a controlled environment has inherent difficulties that have in large part been overcome by the invention that is disclosed in U.S. Pat. No. 5,873,327 (the "'327 patent"). However, one of the continuing problems existing in such a climate controlled environment is the frogs' reluctance to eat artificial food.

Apparently, frogs over the years have consistently refused to eat artificial foods and prefer live food such as insects, minnows or the like. Feeding live bait to frogs in larger farming facilities is simply impractical. In the past, artificial feed has been deposited in the container habitat for frogs. When the feed is dropped on the floor of a container, frogs simply are not interested in eating the seemingly lifeless food particles. In addition to the inherent problem of the frogs not eating the food, the uneaten feed soils the container floor.

Habitat containers maintain a small pool of standing water for the frogs, which track in and out of the water. The wet frogs may stand on feed particles breaking, wetting, and dispersing the feed throughout the container. The containers have to be cleaned periodically which is a labor intensive job including removing the frogs from the container, cleaning the frogs and returning the frogs to the container. Excessive human contact stresses frogs, disrupting feeding patterns and reproductive cycles. In addition, frogs are susceptible to injury during such a removal process.

Inventions have been created in an attempt to more effectively feed frog's artificial food by simulating life-like movement of live food. Two such inventions are disclosed in U.S. Pat. Nos. 4,347,808, (the "808 patent") and U.S. Pat. No. 4,038,947. Such a feeder device is also discussed in the '327 patent. In both the '808 patent and the '327 patent artificial food particles are dropped from a feeder or hopper suspended above the container floor. Unless the frogs actually see the artificial feed dropped into the container, the frogs will ignore the feed in the container, and the same problems occur as previously described. Moreover, uneaten and destroyed artificial feed translates into a loss for the cultivator.

SUMMARY OF THE INVENTION

Accordingly, it is an object of the present invention to provide a method and apparatus for feeding frogs cultivated in a man-controlled environment, artificial food. Another object of the invention is to present the feed to the frogs in such a way to simulate live food, and allow the frogs to capture selected artificial food particles.

These and other objectives are accomplished by the apparatus and method for feeding frogs cultivated in captivity herein disclosed. The apparatus includes a plurality of containers, within which frogs are cultivated, supported in vertically spaced tiers on an upright rack. A plurality of feed trays are provided wherein a feed tray is provided for each container. Artificial feed, in the form of a plurality of pellets, or discrete feed particles, are supplied in the feed tray. Discrete particles of feed, or single pellets, are selected simultaneously from the feed trays, and transferred to the interior of each container, and suspended therein for frogs to capture and eat. The frogs are capable of viewing the transfer of the feed pellets from the feed tray to the container and the pellet within the container, so the movement of the feed simulates live food.

An air suction system is utilized for engagement of the discrete particles. Air is drawn through a feed engagement member so a suction force is created at the tip of the feed engagement member to engage pellets. The feed engagement member is actuated toward the feed tray to engage the pellets. Then the feed engagement member is activated to the interior of the container where the frogs take the pellets off of the feed engagement member.

The air flow direction can, in the air suction system, also be reversed so air is blown out through the feed engagement member in order to clean the same and any conduits or lines leading to the feed engagement member.

DETAILED DESCRIPTION OF THE INVENTION

Figure 1:
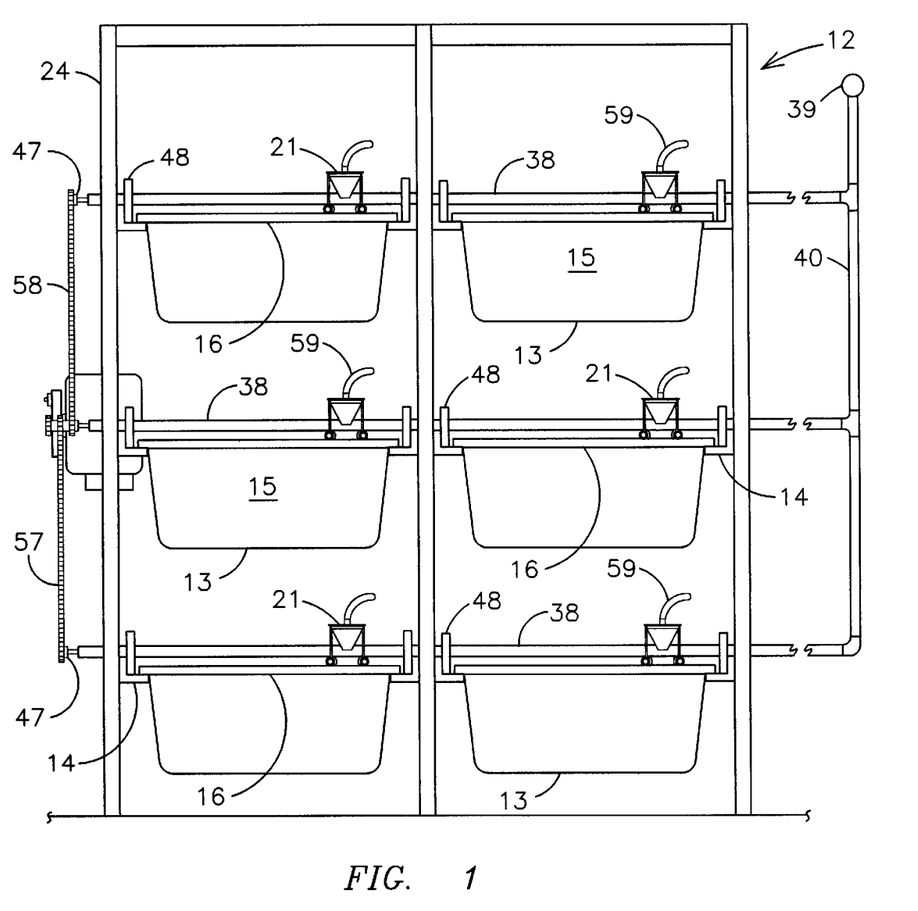
FIG. 1 is a front elevational view of an embodiment of an apparatus for cultivating and feeding frogs.
Figure 2:
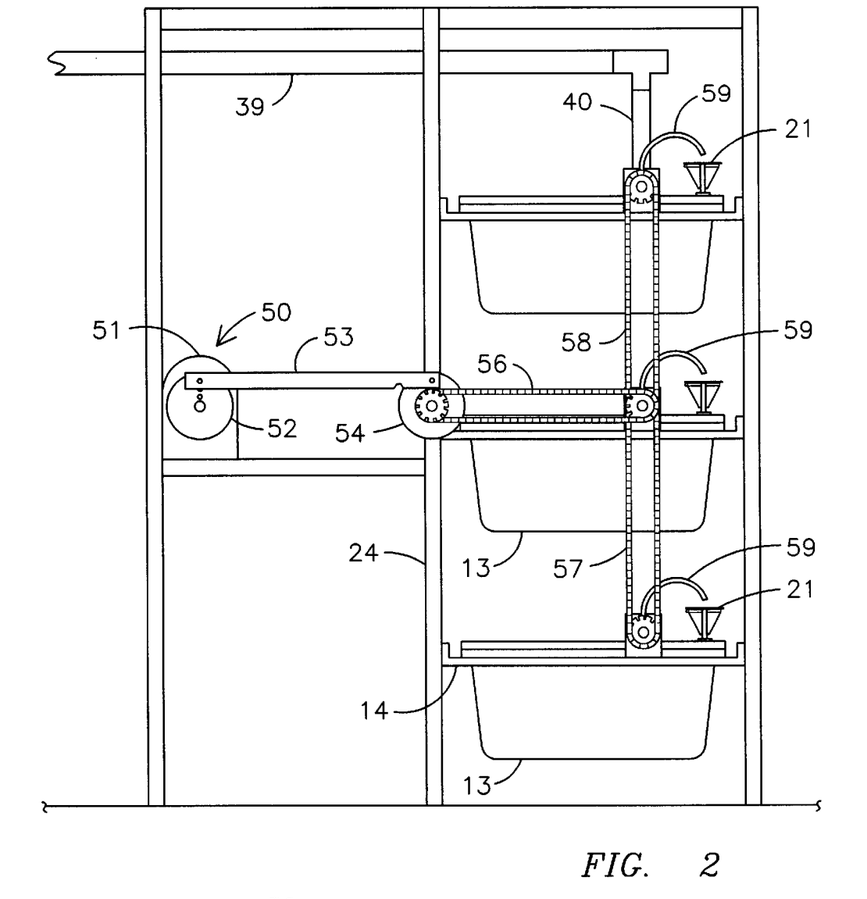
FIG. 2 is a first side elevational view of an embodiment of an apparatus for cultivating and feeding frogs.
Figure 3:
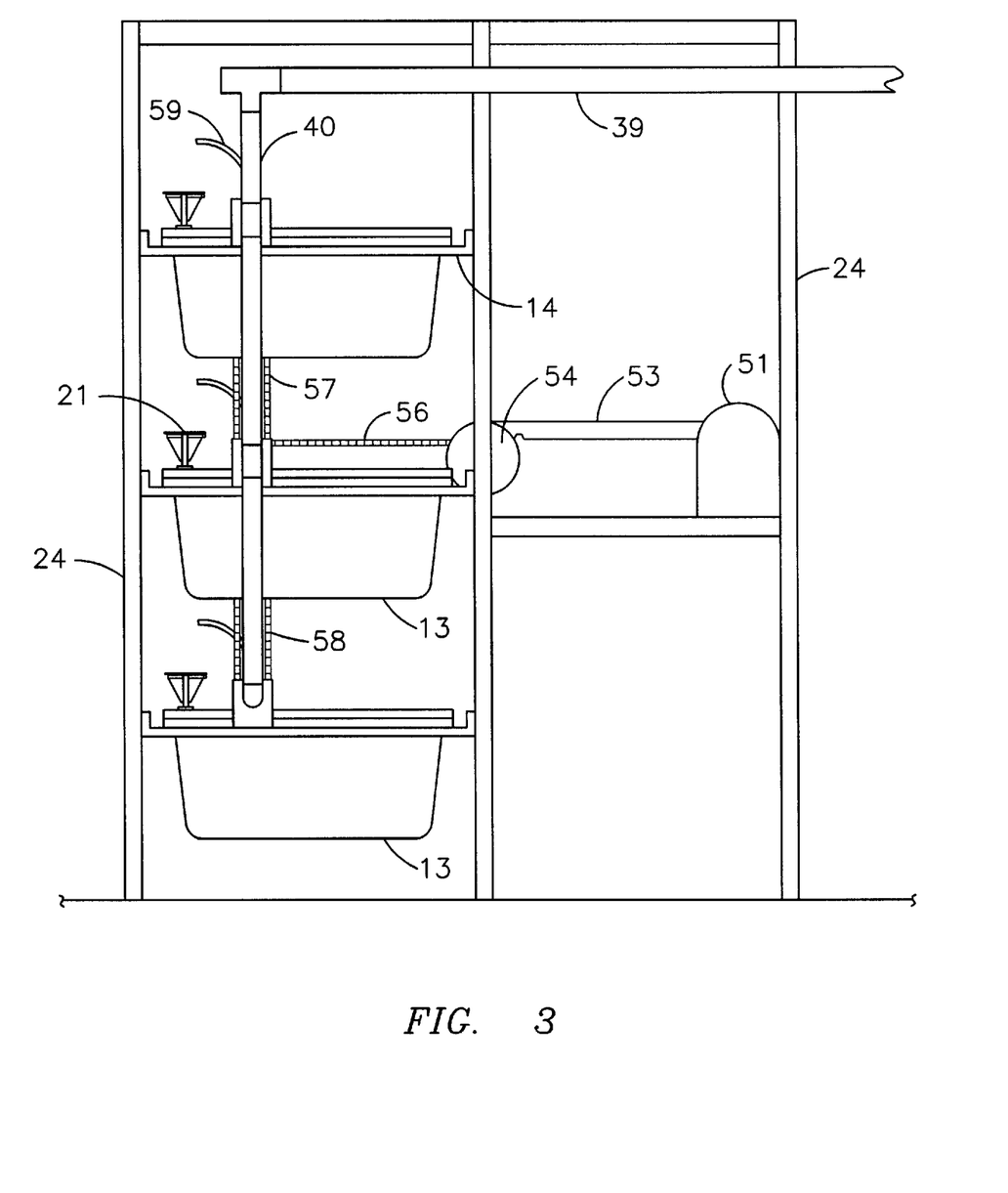
FIG. 3 is a second side elevational view of an embodiment of an apparatus for cultivating and feeding frogs.

The apparatus for feeding frogs is generally shown in FIGS. 1–3 and this embodiment includes an upstanding rack 12 supporting a plurality of containers 13. Each of the containers 13 defines a habitat for the frogs, which are cultivated within the container 13. The upstanding rack 12 has a plurality of vertically spaced tiers of containers 13. The containers 13 are maintained within a climate controlled room. The upstanding rack 12 includes vertical members 24 and horizontally extending brackets 14. Brackets 14 include a vertical leg 18 and horizontal leg 17.

The containers 13 are supported on brackets 14. More specifically, containers 13 have substantially vertical sidewalls 15 and a floor 25 defining an interior of the container 13. A horizontally disposed rim 16 extends along a top edge of the container 13, and engages the brackets 14, so the container 13 is supported on the rack 12 as shown in FIGS. 1 through 3 and 6.

A means, detachably secured to the container, for covering the top 26 of the container 13, prevents frogs from escaping the container 13. Such cover means is adequately perforated to aerate the container 13, and also provides access to the interior the container 13 for feeding the frogs. In addition, the cover perforations, or holes, are preferably large enough to inspect the frogs and container 13 without removing the cover. With respect to FIGS. 4 and 5, the illustrated cover is a nylon or plastic netting 19. The netting 19 shown in this embodiment includes top pieces 19A and 19B separated by a gap 27 which is sufficiently narrow to prevent frogs from leaping out of the container 13, but wide enough for feeding frogs as will be described in more detail below. The netting 19 is removable to capture frogs and maintain the container 13. The cover means may also include a more rigid member as a plastic molded cover having the above-described characteristics.

Figure 4:
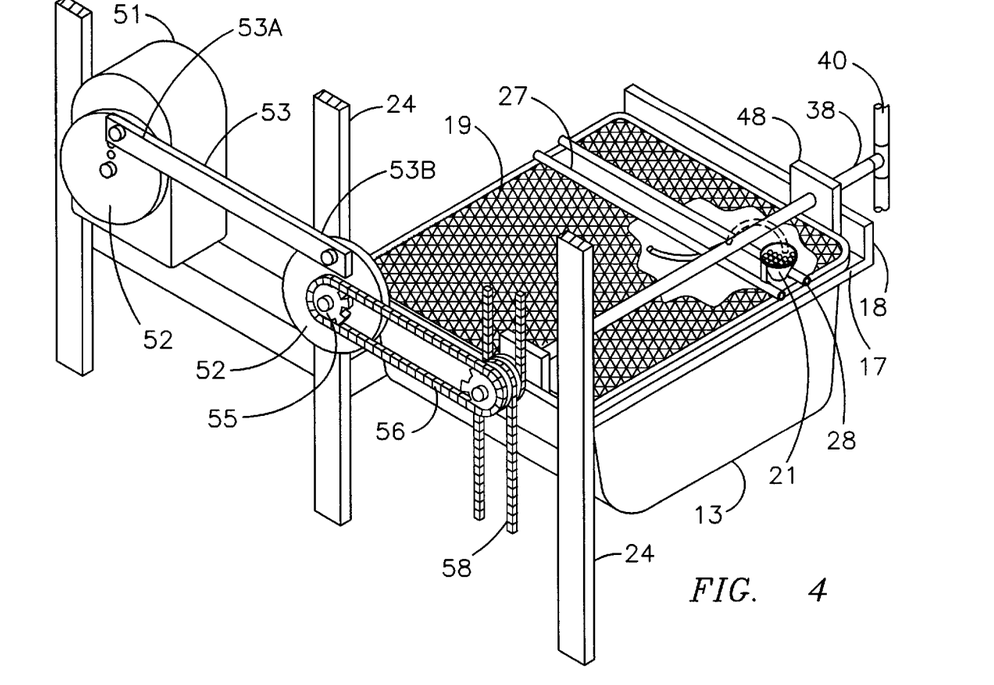
FIG. 4 is a top perspective view of a container and motor drive used for cultivating and feeding frogs.
Figure 5:
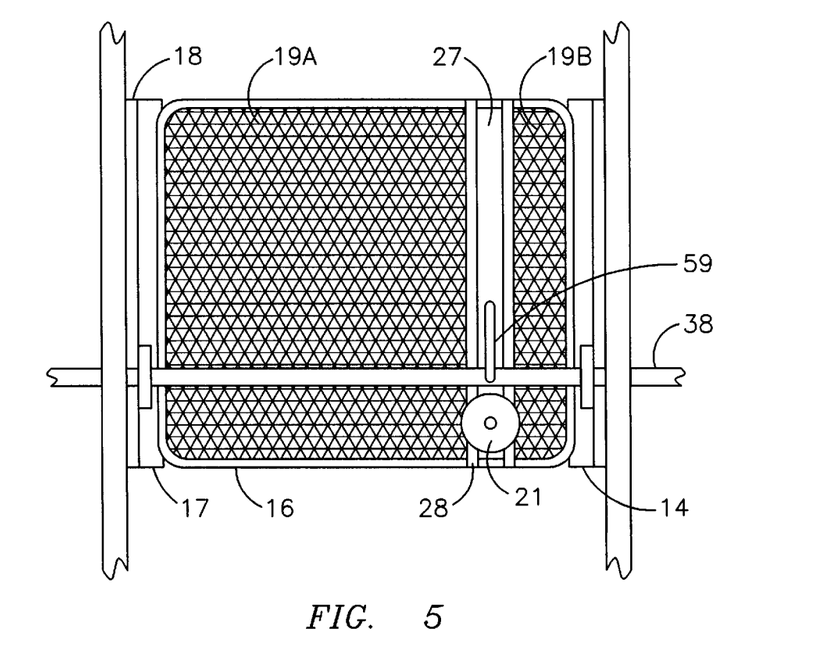
FIG. 5 is a top view of a container used for cultivating and feeding frogs.
Figure 6:
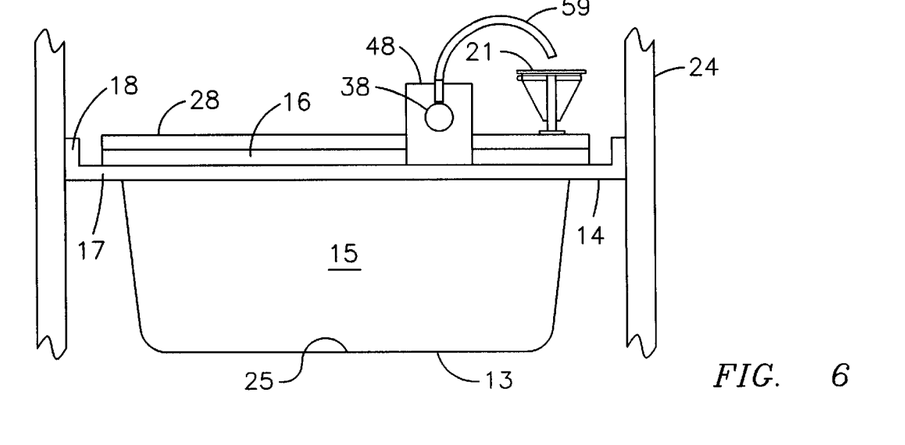
FIG. 6 is a side view of a container used for cultivating and feeding frogs.

As shown in FIGS. 4 and 5, spacers 28 separate the netting 19 forming the gap 27. The spacers 28 are members extending across the top opening 26 of the container 13 parallel to one another. The netting 19 covers the entire open top 26 of the container 13 with the exception of the gap 27 between spacers 28 thus allowing food to be presented to frogs within the container 13 while preventing the frogs from escaping from the controlled environment within the container 13.

A feed source is placed adjacent the containers. The feed source includes a feed tray 21 holding artificial feed 20. The artificial feed 20 consists of a plurality of pellets, or discrete particles, comprising various nutrients critical to the development of frogs. With respect to FIG. 1 through 5, the feed 20 is stored within a plurality of feed trays 21, with each feed tray 21 mounted adjacent a corresponding container 13. With respect to FIGS. 4 through 7, a feed tray 21 is shown mounted on spacers 28. A single feed tray 21 is secured adjacent each container 13. The feed tray 21 disclosed in this embodiment has a conical shape having an enlarged opened top 30 narrowing to a bottom 31. Each feed tray 21 is mounted on the spacers 28 within the perimeter of the container 13 defined by the sidewalls 15 of the container 13.

The feed trays 21 are not required to be mounted within container 13 perimeter, but may be disposed at a position adjacent the container 13, or possibly within the container 13 and spaced above the floor of the container. In this manner, the discrete particles of artificial feed may be selected therefrom and presented to the frogs within the container 13. It is also contemplated that a single trough may be used extending adjacent a row of containers within a tier on the upstanding rack.

As previously mentioned above, and illustrated in FIG. 7, the feed tray 21 is supported within a small dispensing frame including a clamp 32 extending annularly about a tray rim 35 of the feed tray 21. Two uprights 33 depend from clamp 32, parallel to one another, to a gripper 34. The upright 33 is generally constructed of a resilient material such as PVC. The dimension between the uprights 33 is slightly larger than the width of the gap 27 between the spacers 28. In as much as the uprights 33 are resilient, the uprights 33 can be displaced toward each other slightly so the grippers 34 are biased against the spacers 28.

The size of the feed tray 21 varies according to the developmental stage of the frogs. A smaller size of frogs tray 21 is used for younger and/or smaller frogs to prevent overfeeding frogs.

The method and apparatus described herein also includes means, associated with the upright frame 12 and plurality of containers 13, for automatically selecting from each said feed tray 21 a discrete particle of feed, and then suspending the discrete particle (or pellet) of feed within the container so the frogs may capture the pellet for eating. The discrete particle is drawn from the feed tray 21 and transferred to the interior of the container 13, and suspended therein within the sight of the frogs to simulate the movement of live food. Feed 20 is selected from the feed tray 21 by a air-suction system that presents feed into the container 13. This air suction system selects a discrete particle of feed from the feed tray at a given time to present the same within the container for feed to the frogs. The system is preferably designed to simultaneously select a discrete feed particle from each of the plurality of feed trays 21, and present the feed into each of the containers for the frogs to feed.

The vacuum system includes a vacuum unit 36, activated by a motor 37, in air communication with a plurality of conduits 38. As shown in FIG. 1–3, the conduits 38 are connected to a supply line 39 by a drop line 40. The supply line 39 is disposed horizontally and extends to a point outside of the room within which the upright rack 12 stands. With respect to FIGS. 10 and 11, a vacuum conduit 41 and a blower conduit 42 extend vertically downward from the supply line 39 to the vacuum unit 36. The vacuum unit 36 and motor 37 are placed outside to eliminate unnecessary noise in the room which may disturb the frogs.

Figure 10:
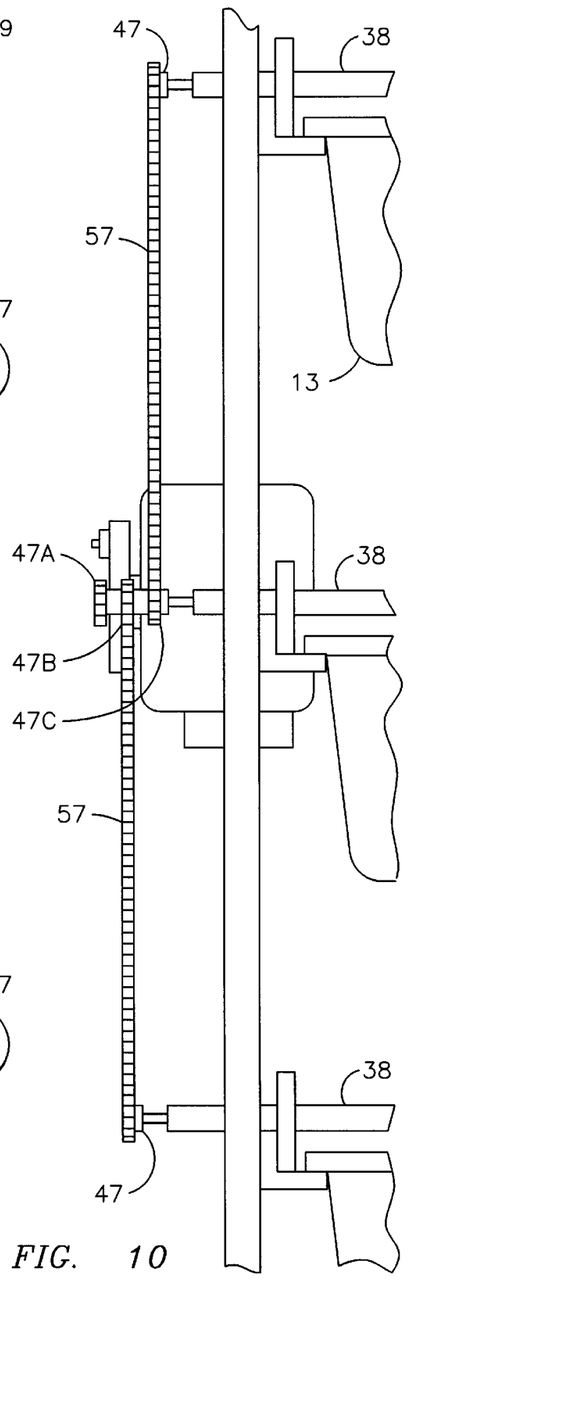
FIG. 10 is an expanded view of gears and timing belts of the drive mechanism.
Figure 11:
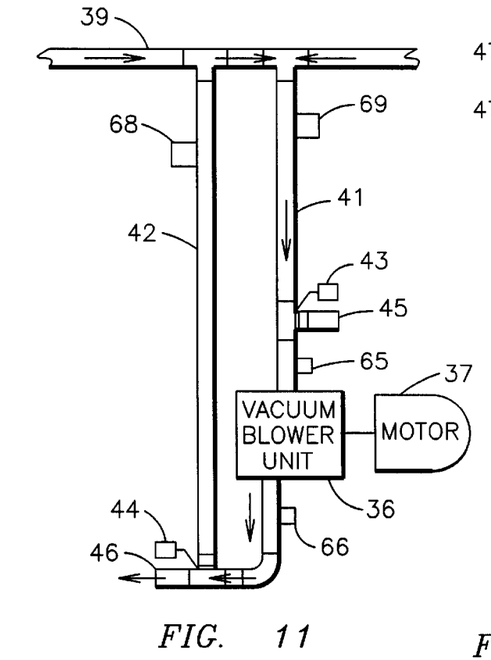
FIG. 11 is a schematic showing the suction air-flow of an apparatus for cultivating and feeding frogs.

Two solenoid-controlled valves or dampers 43 and 44 direct the airflow between a suction mode for the selection of feed pellets and cleaning mode. As shown in FIGS. 10 and 11 a first valve 43 is mounted adjacent an intake line 45 the vacuum conduit 41; the second damper 44 is mounted adjacent an exhaust line 46 the blower conduit 42.

With respect to FIGS. 1 through 3, the conduits 38 are connected to the supply line 39 by drop line 40 depending vertically from the supply line 39. The conduits 38 extend horizontally through the upright rack 12. Each conduit 38 extends over a row of containers 13 within a respective tier of containers 13. Each container 13 has a first end attached to the line 40, and a second end having a gear 47 mounted thereon. The containers 13 are supported on the upright rack 12 by bearings or bushings 48 so the conduits 18 are rotatable for the selection of discrete particles of feed 20 from a feed tray 21.

A feed engagement member is mounted on the conduits and is illustrated as a flexible suction tube 59. The suction tube 59 is mounted to each conduit 38 adjacent a respective feed tray 21 for the selection of discrete particles of feed from the feed tray 21 and presentation of the feed to the frogs in the container 13. The suction tube 59 is fixed to the conduit 38 by fitting 60. The fitting 60 may include a copper base 61 secured to the conduit 38; and a hard plastic tube 62 is fixed to the copper base 61. The suction tube 59 is a clear flexible tube to detect any clogs in the suction tube 59.

In addition, suction tubes 59 of different diameters are interchangeable on the fitting 60. A respective feed tray 21 should have a single size of feed pellets. The size of the pellets will depend on the developmental stage of the frogs. The more mature the frogs, the larger the feed particles in the feed tray provided in the feed tray 21. Accordingly, the suction tube 59 must accommodate the size of the pellets in the feed tray 21. The suction tube 59 is sufficiently large to capture a discrete particle of feed from the feed tray 21, yet small enough to avoid having such a pellet from lodging within the conduit 38.

Figure 8:
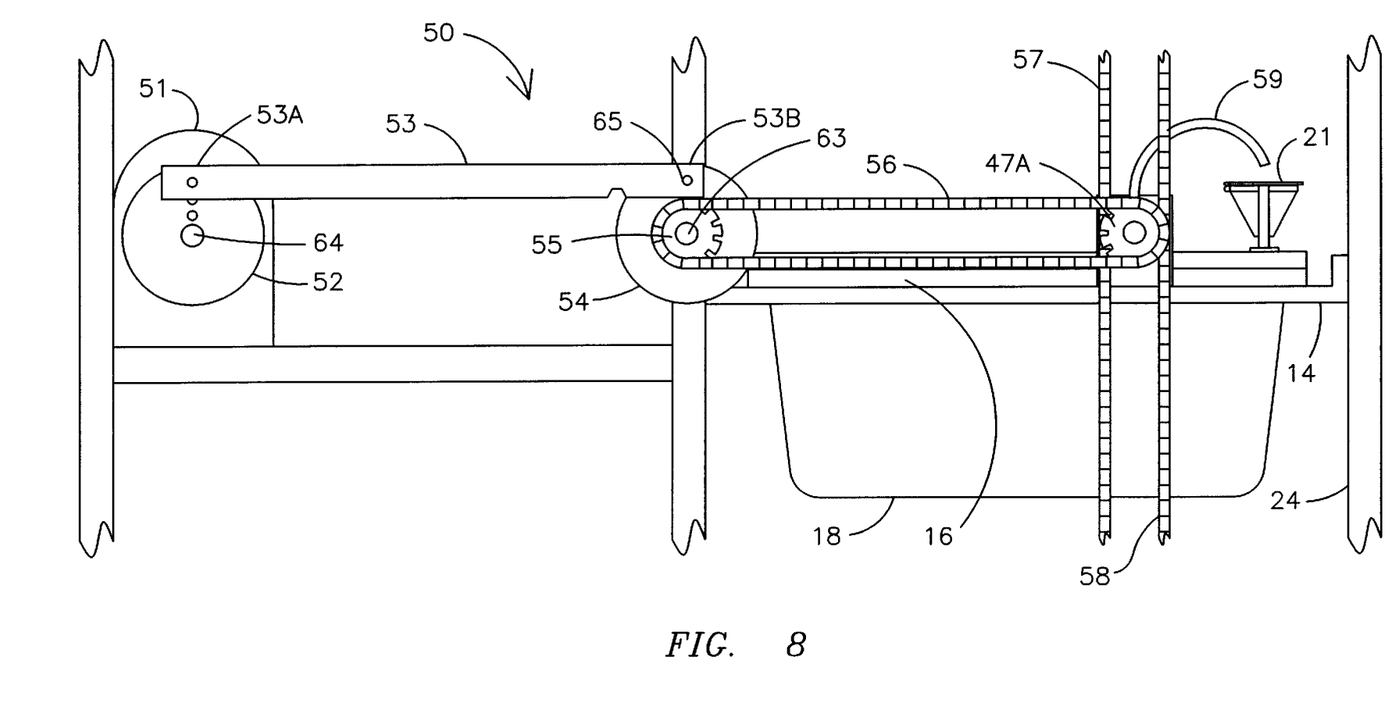
FIG. 8 is a side view of a drive system used in an embodiment for an embodiment of an apparatus for cultivating and feeding frogs.

As shown in FIG. 2, and FIG. 8, the conduits 38 are rotated by drive mechanism 50, gears 47 and timing belts 56–58. The drive mechanism 50 is activated by motor 51 which rotates main disc 52 at a rate of 1 to 5 rotations per minute. An arm 53 is mounted to the main disc 52 at its first end 53A and mounted to a second disc 54 at its second end 53B. The second disc 54 is mounted to a shaft 63 which is rotatably mounted on the upright rack 12. A gear 55 is similarly mounted to the shaft 63, in spaced relation to the disc 54.

With respect to FIGS. 1, 8, and 10 a first timing belt 56 engages gear 55 mounted on the second disc 54 and gear 47A mounted on a conduit 38. In the embodiment shown in these drawings the first timing belt 56 engages the gear 47A on the middle tier of containers 13 of a three tier system. The conduit 38 on the middle tier actually has three timing gears 47A, 47B and 47C mounted on its second end. The outer most gear 47A, as previously mentioned, is linked to the second disc 54 by the first timing belt 56. A second timing belt 57 engages the middle gear 47B and gear 47 on the conduit 38 of the bottom tier of containers 13. A third timing belt 58 engages the inner most gear 46C, and the gear 47 mounted on the conduit 38 of the top tier of containers 13.

First end 53A of the arm 53 is mounted 12 inches from an outer edge of the main disc drive 52; similarly, the second end 53B of the arm 53 is mounted ½ inches from and outer edge of the second disc 54. The first end of arm 53A is mounted on a shaft 64 which rotates within a mounting hole on the main disc drive 52. Similarly, the second end 53B is fixed to a shaft 65 that rotates within a mounting holes the second disc 54. The operation of the main disc drive 52 and the second disc 54 rotates the conduits 38 back and forth 180 degrees as shown in FIGS. 9A through 9E.

In operation, the vacuum unit 36 and vacuum motor 37 are activated to operate in a suction mode. The first valve 43 is in a closed position with respect to the intake line 45, and the second damper 44 is closed with respect to the blower tube 42. Air is drawn through the conduits 38, supply line 39, vacuum conduit 41, vacuum unit 36 and exhaust line 46, as shown in FIG. 10. In this manner a suction force is created at the tip of the suction tube 59 in order to capture discrete particles of feed 20 from the feed tray 21 when the conduits 13 are rotated toward the feed tray 21. A check valve 69 may be mounted in conduit 41 allowing air flow in only a single direction shown in FIG. 11.

In this regard, and with respect to FIGS. 9A–9E, the drive mechanism is also activated including the rotation of the main disc 52 in a clockwise direction. The arm 53 in turn rotates the second disc 54 concomitantly in a clockwise direction. The second disc 54 rotates the gear 55 mounted thereon; and, the three timing belts 56, 57 and 58 synchronize the rotation of each of the conduits 38, so all the conduits rotate simultaneously. Consequently, the suction tube 59 on each rotating conduit 38 is actuated toward the feed tray 21 to engage a discrete particle of feed 20.

Figure 9A:
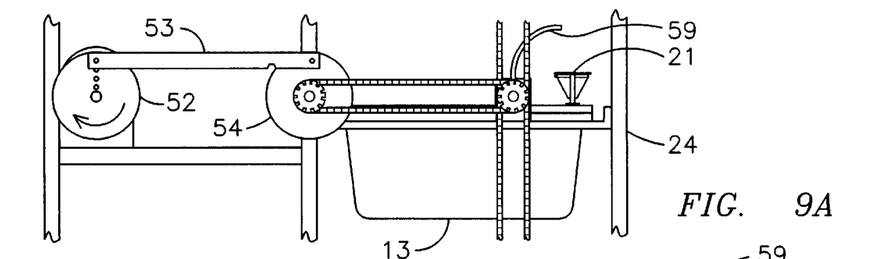
FIGS. 9A through 9E are views of the steps in the feeding process from an embodiment of an apparatus for cultivating feeding frogs.
Figure 9B:
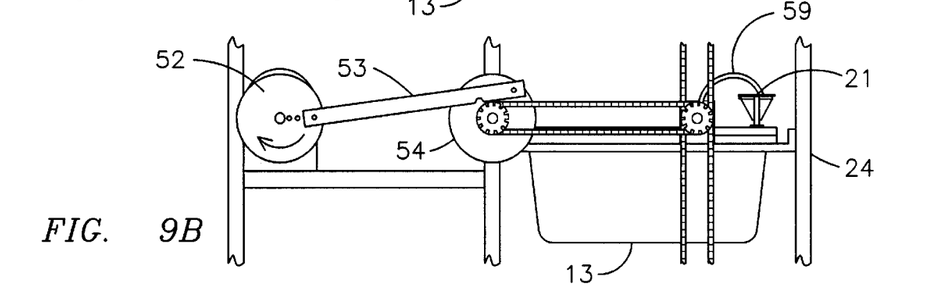
Figure 9C:
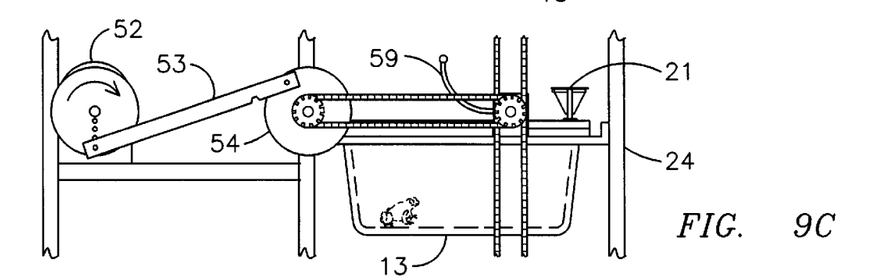
Figure 9D:
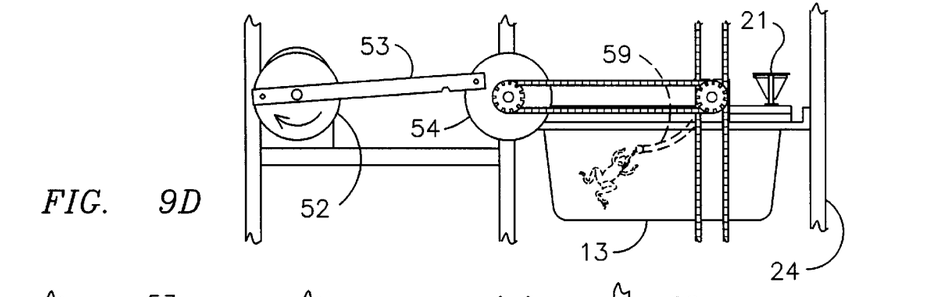
Figure 9E:
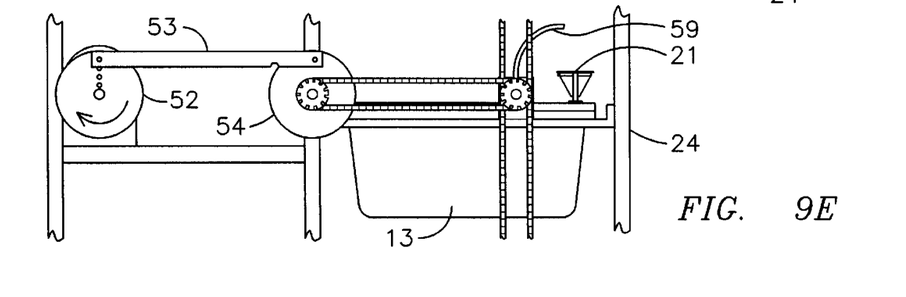

As shown in FIG. 9B, the first end 53A of the arm 53 pivots on the main disc 52 as the disc 52 completes its first quarter of a revolution. When the main disc 52 begins the second quarter of a revolution, the arm 53 reverses the rotation of the second disc 54, thereby rotating the conduit 38 in a counter-clockwise direction. Consequently, the suction tube 59 is actuated into the interior of the container as the main disc 52 reaches three-quarters of a revolution. Given the rate of rotation of the discs 52 and 54, the suction tube 59 slowly descends within the container, holding the discrete particle of food on the tip of the suction tube 59. The suction tube 59 virtually suspends the feed particle within the container so the frogs can easily capture the food. In this manner, the frogs within the container 13 are able to see the food particle, or pellet, and are able to react, capture and eat the pellet. As the main disc 52 completes a full revolution the arm 53 rotates the second disc 52 in a clockwise direction, actuating the suction tube 59 toward the feed tray 21 again. These steps continue until either the motor mechanism 51 is deactivated, or the air flow is redirected to a cleaning mode.

Figure 7:
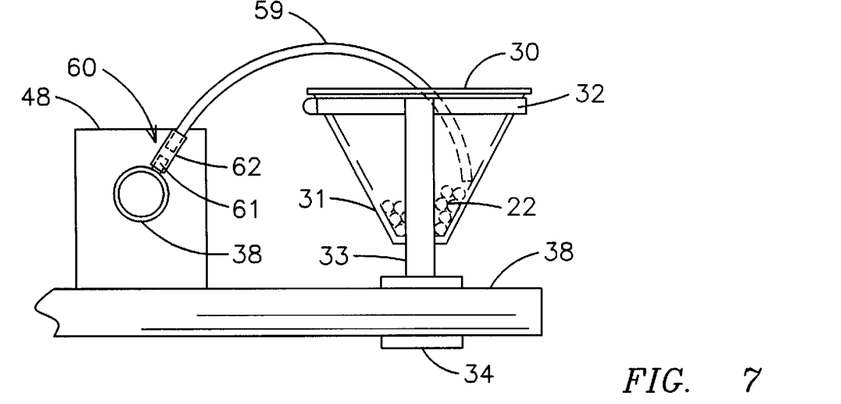
FIG. 7 is a side elevational view of a feed tray on an embodiment of an apparatus for cultivating and feeding frogs.

The conduits 38 rotate simultaneously so the frogs in each container 13 are being fed, when food is available in the feed tray 21. Over time the feed tray 21 empties; however, given the flexible nature of the suction tube 59 and the conical shape of the feed tray 21, the suction tube 59 is still capable of engaging the discrete particles of feed at the bottom 31 of the feed tray 21. The suction tube 59 contacts the interior surface of the feed tray 21. As previously described, the feed tray 21 has a conical shape so the interior surface is inclined. The suction tube 59 bends as it contacts the surface and slides downward to engage pellets toward the bottom of the feed tray 21, as shown in FIG. 7.

Figure 12:
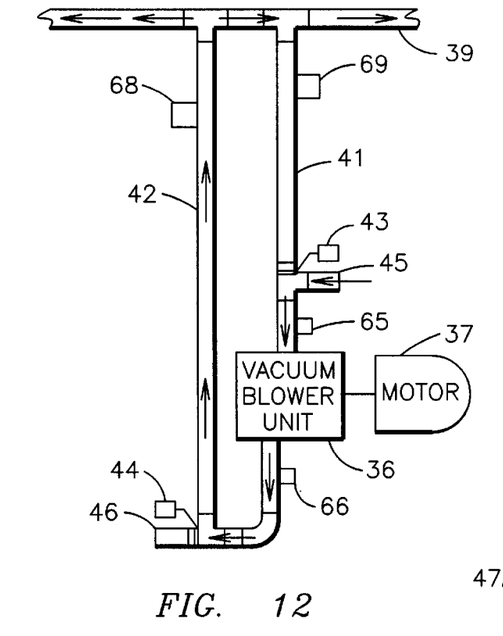
FIG. 12 is a schematic showing the air-flow direction in a cleaning step in an apparatus for cultivating and feeding frogs.

During this entire process the conduits 38 remain in air communication with the vacuum unit 36 which provides a continuous suction air flow for capture of the feed particles. Eventually the suction tube 59 or possibly other lines or conduits in the system become clogged. The air flow through lines and conduits is redirected for cleaning as shown in FIG. 12. More specifically, the first valve or damper 43 opens the intake line and closes the vacuum conduit 41. In addition, the second valve damper 44 is actuated thereby closing the exhaust line 46, and opening the blower conduit 42. Air is then forced through the supply line 39, conduits 38 and suction tubes 59, cleaning the same. A check valve 68 can be mounted in the blower conduit 42 to allow air flow in only a single direction as shown in FIG. 12. The valves 43 and 40 may be activated by solenoids which are operated from timers, so the lines are cleaned periodically. The dampers 44 and 45 could also be manually activated when clogs in the lines are detected. In addition, a first relief valve 65 is mounted adjacent the intake portion of the vacuum unit 37, and a second relief valve 66 is mounted to an exhaust end of the vacuum unit. These relief valves 65 and 66 are activated to open if the conduits, lines or suction tubes are clogged in order to avoid extreme pressure increase in the lines, conduits or suction tubes.

The number of containers 13 and conduits 38 may vary. Consequently the size of the vacuum unit 37 and motor 38 will also vary. For example, an upright rack may support twenty-one rows of containers in three vertically spaced tiers for a total of sixty-three containers 38. This includes a total of sixty-three 38 which are approximately fifty feet in length and having two to three inch diameters. In as much as a feed tray 21 is mounted adjacent each container 13, the unit includes 63 feed trays, and consequently 63 suction tubes having up to a ¼ inch diameter. A vacuum unit 37 having a motor operating @ 5 horsepower roots is sufficient for operation of the system. One skilled in the art will be able to determine the size of the vacuum unit without undue experimentation.

Figure 13:
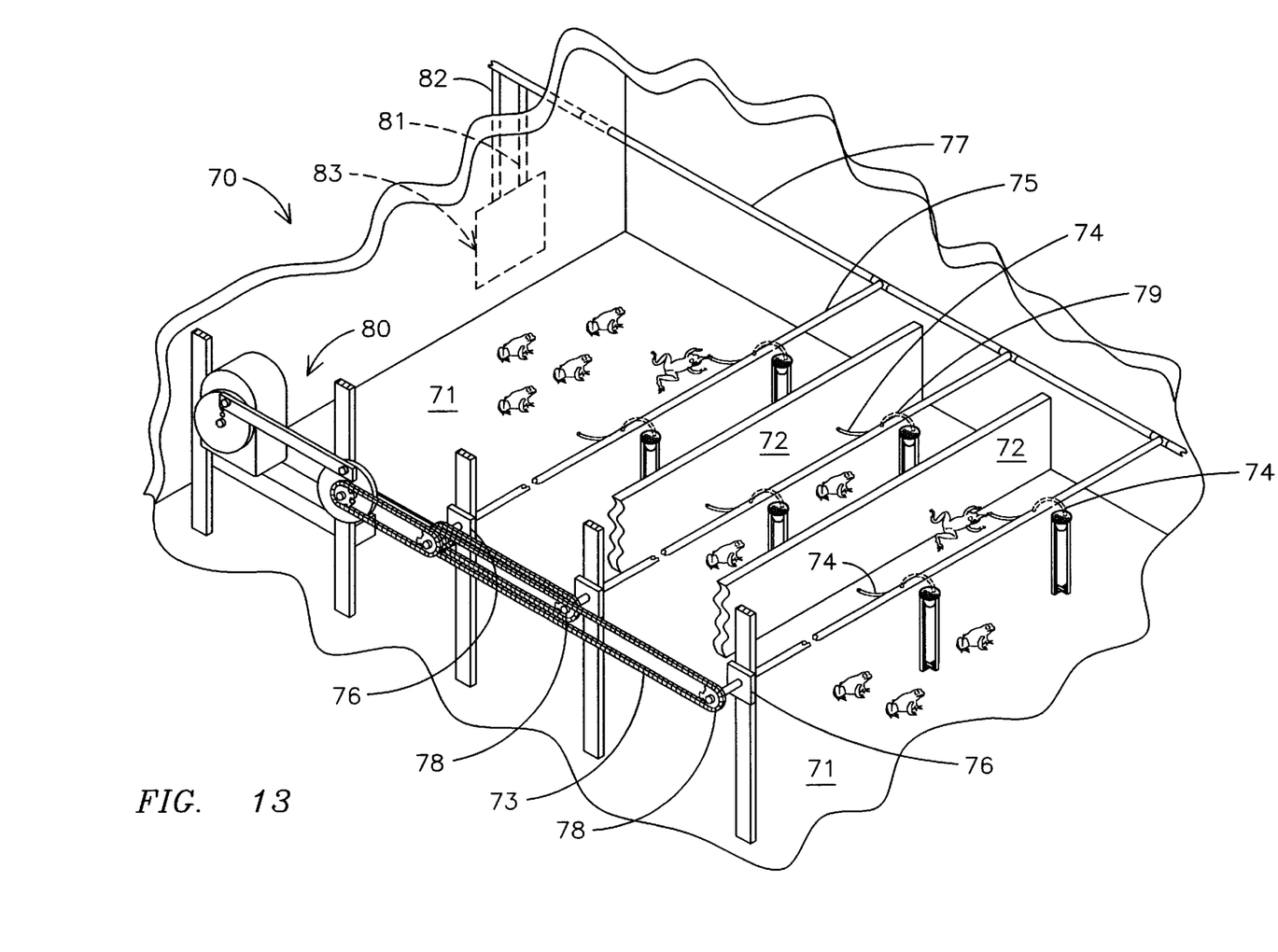
FIG. 13 is a cultivating room for frogs utilizing the feeding apparatus.

This same process can be incorporated in the embodiment shown in FIG. 13. In some cases the frogs are raised in environment controlled rooms 70; however, the previously described containers are not used. Instead the frogs are simply allowed to roam the floor 71. The room 70 itself serves as the habitat container 13. Partitions 72 may be placed in the room to divide the room 70 into a plurality of compartments. The partitions 72 separate the frogs of different sizes or development stages. However partitions 72 do not have to be used at all.

A plurality of feed trays 74 are disposed along the floor 71 and contain artificial feed. The feed trays 74 have the previously described conical shape and are fixed to the floor 71 or partitions 72 to prevent the frogs from tipping over the feed trays 74. Pellets or discrete particles of the artificial are selected from the feed tray 74 and presented to the frogs according to the same previously described process.

The above referenced air suction system is used to select the artificial feed from the feed trays 74. A plurality of conduits 75 are disposed above the floor 71 and supported thereon by bushings or bearings 76. The conduits 75 are mounted in air communication with the vacuum unit 83 by a supply line 77, a blower conduit 82 and a vacuum conduit 81. The conduits 75 rotate on the bushings 76, and are driven by drive mechanism as previously described.

A first end of the conduits 75 is rotatably linked to the supply line 77. Gears 78 are mounted on a second end of the conduit 75 and are operationally linked to the drive mechanism 80 by timing belts 73. The drive mechanism drives the gears 77 and pivots the conduits 75 back and forth 180 degrees. A plurality of suction tubes 79 are mounted on each conduit 75 for selection of pellets from the feed tray 74. The previously described operation of the air suction system and drive mechanism applies in this embodiment to select the discrete particles of artificial feed and clean the air lines.

While the preferred embodiments of the present invention have been shown and described herein in the context of cultivation of frogs, it will be obvious that such embodiments are provided by way of example only and not of limitation. Numerous variations, changes and substitutions will occur to those of skilled in the art without departing from the invention herein. For example, the present invention need not be limited to cultivation of frogs, since other types of animals can equally benefit from the teachings of the present invention. Accordingly, it is intended that the invention be limited only by the spirit and scope of the appended claims.

What is claimed is:

1. An apparatus and method for feeding frogs cultivated in captivity, comprising:
   a) an upright rack;
   b) a plurality of containers, within which frogs are cultivated, supported on said rack in a plurality of vertically spaced tiers;
   c) an artificial feed source mounted adjacent a top opening of each container; and
   d) automated means, associated with said upright rack and containers, for selecting a discrete particle of artificial feed from said feed source, and for suspending said discrete particle of artificial feed within each container above a floor of the container.

2. An apparatus for feeding frogs as defined in claim 1 wherein said means for selecting and suspending discrete particles of food, includes a vacuum unit and motor, a plurality of conduits, each said conduit in air communication with said vacuum unit and each conduit extending across a respective tier of containers on said upright rack, a feed engagement member secured to each said conduit, adjacent said feed source in air communication with said conduit and vacuum unit, and means, operably linked to an end of each conduit, for concomitantly rotating said conduits during operation of said vacuum unit, between a position for said food engagement member to engage a discrete food particle within said artificial feed source to a position suspending said discrete food particle on a tip of said feed engagement member within said container.

3. An apparatus as defined in claim 2 further including means, mounted adjacent to said vacuum unit, for redirecting airflow within said conduits for cleaning said conduits.

4. An apparatus as defined in claim 3 wherein said conduits are connected to a supply line which is in air communication with said vacuum unit via a vacuum conduit and a blower conduit, and said airflow redirection means includes a first valve mounted in an air intake line which is connected to said vacuum conduit and a second valve mounted adjacent an air exhaust line which is connected to an exhaust end of said vacuum unit.

5. An apparatus as defined in claim 2 wherein each said container has side walls and end walls extending substantially vertically upward from a floor, an open top and a cover extending over said open top, said cover having a gap through which said food engagement member may pass with said discrete food particle engaged thereon.

6. An apparatus for feeding frogs as defined in claim 5 wherein seed feed source includes a plurality of feed trays, each feed tray adjacent a corresponding container, and said feed tray having a conical shape, and said feed engagement member is a flexible plastic tube member.

7. An apparatus for feeding frogs as defined in claim 6 wherein said upright rack supports said plurality of containers in a plurality of vertically spaced tiers, and each conduit extends over a corresponding tier of containers, said conduits supported on said upright rack by at least one bushing.

8. An apparatus as defined in claim 7 wherein said drive means includes a first timing gear operably linked to one conduit, and the remaining conduits having a timing gear mounted on a second end thereof and operationally linked with said first timing gear by timing belts.

9. An apparatus for feeding frogs cultivated in captivity, comprising:
   a) at least one container within which frogs are cultivated in a controlled environment, said container having a floor and side walls defining an interior of the container;
   b) a feed tray, adjacent said container, that holds artificial feed; and,
   c) automated means, associated with said container and upright rack, for selecting a discrete particle of feed from said artificial feed in the feed tray and suspending said discrete particle of feed within said container.

10. An apparatus for feeding frogs as defined in claim 9 wherein said automated means for selecting and suspending discrete particles of food, includes, a vacuum unit and motor, at least one conduit in air communication with said vacuum unit and said conduit extending over said container, a feed engagement member secured to said conduit, adjacent said feed source in air communication with said conduit and vacuum unit, and means, operationally linked to an end of each conduit, for rotating said conduit during operation of said vacuum unit, between a position for said food engagement member to engage a discrete food particle within said food tray to a position suspending said discrete food particle on a tip of said feed engagement member within said container.

11. An apparatus as defined in claim 10 further including means, mounted adjacent to said vacuum unit, for redirecting airflow within said conduits for cleaning said conduits.

12. An apparatus as defined in claim 11 wherein said conduits are connected to a supply line which is in air communication with said vacuum unit via a vacuum conduit and a blower conduit, and said airflow redirection means includes a first valve mounted in an air intake line which is connected to said vacuum conduit and a second valve mounted adjacent to an air exhaust line which is connected to an exhaust end of said vacuum unit.

13. An apparatus as defined in claim 12 wherein each said container has side walls and end walls extending substantially vertically upward from a floor, an open top and a cover extending over said open top, said cover having a gap through which said food engagement member may pass with said discrete food particle engaged thereon.

14. An apparatus for feeding frogs as defined in claim 13 seed feed source include at least one feed trays, and said feed tray is adjacent a corresponding container, and said feed tray having a conical shape, and said feed engagement member is a flexible plastic tube member.

15. An apparatus for feeding frogs as defined in claim 14 further including an upright rack supporting a plurality of in a plurality of vertically spaced tiers, and a plurality of conduits and each conduit extends over a corresponding tier of containers, said conduits supported on said upright rack by at least one bushing.

16. An apparatus as defined in claim 15 wherein said drive means includes a first timing gear operationally linked to one conduit, and the remaining conduits having a timing gear mounted on a second end thereof and operationally linked with said first timing gear by timing belts.

17. A method for feeding frogs cultivated in captivity, comprising the steps of:
    a) providing a room within which frogs are cultivated, said room having a floor, walls and a ceiling;
    b) providing a feed source within the room including artificial feed having therein discrete particles of artificial feed;
    c) simultaneously selecting from said feed source a plurality of discrete particles of artificial feed; and,
    d) simultaneously transferring each of the discrete particles of artificial feed from said feed source to the frogs within sight of said frogs, and suspending said discrete particle of feed above the floor of the room.

18. A method as defined in claim 17 further including the step of separating the frogs by developmental stages of the frogs or sizes, and the step of providing artificial feed particles includes the step of providing discrete particles of artificial feed at a size and amount nutritionally adequate for the frogs cultivated of a selected size or developmental stage.

19. A method as defined in claim 18 wherein after said discrete particle of feed is captured by frogs within the room, said selecting step and suspending step are simultaneously repeated.

20. A method as defined in claim 19 wherein said room has an air suction system associated therewith and includes a plurality of feed engagement members, and said step of selecting discrete particles of feed includes drawing air through said feed engagement member for suction engagement of a discrete particle of artificial feed, and actuating said feed engagement member toward said feed source member for suction engagement of a discrete particle of artificial feed, then actuating said feed engagement member, with said discrete particle of artificial feed thereon, to a position suspended above the frogs within sight of the frogs for said frogs to capture said discrete particle of artificial of feed.

21. A method as defined in claim 20 further including the step of reversing said air flow through said air suction system and feed engagement member so air is blown out of said feed engagement member for cleaning said air suction system.

22. A method as defined in claim 17 wherein said step of selecting discrete particles of feed includes drawing air through said feed engagement member for suction engagement of a discrete particle of artificial feed, and continuously actuating back and forth said feed engagement member between a position within said feed source member for suction engagement of a discrete particle of artificial feed, to a position within an interior of the container for frogs to capture said discrete particle of artificial of feed.

23. A method as defined in claim 22 further including the step of reversing said air flow through said air suction system and feed engagement member so air is blown out of said feed engagement member for cleaning said air suction system.

24. An apparatus for feeding frogs cultivated in captivity, comprising:
    a) a feed source including artificial feed having therein discrete particles of artificial feed;
    b) a feed engagement member for selecting discrete particles of feed from said feed source; and,
    c) a drive mechanism, operationally linked to said feed engagement member, transferring said feed engagement member back and forth between a position for drawing food from said feed source to a position of presenting said discrete particle of food within the grasp of frogs.

25. The apparatus of claim 24 wherein a passageway extends through said feed engagement member and said passageway is in air communication with a vacuum system, which creates a suction force in said feed engagement member for engagement of said discrete particle from said artificial feed.

26. The apparatus of claim 25 wherein said vacuum system operates in a suction mode drawing air through passageway of said feed engagement member for selection of the artificial feed particles and a cleaning mode for blowing air through the passageway and out of the feed engagement member.

27. The apparatus for feeding frogs of claim 24 further including a plurality of containers within which frogs are cultivated, said artificial feed source is disposed adjacent to each said container, and a plurality of feed engagement members and each said feed engagement member having a passageway extending through said feed engagement member and said passageway is in air communication with a vacuum system, which creates a suction force in said feed engagement member for engagement of said discrete particle from said artificial feed.

28. The apparatus for feeding frogs of claim 27 wherein said feed rouce includes a plurality of feed trays, each feed tray is adjacent a corresponding container.

29. The apparatus for feeding frogs as defined in claim 28 further including an upright rack for supporting said plurality of containers in a plurality of vertically spaced tiers.

30. The apparatus for feeding frogs as defined in claim 29 wherein each said container has side walls and end walls extending substantially vertically upward from a floor, an open top and a cover extending over said open top, said cover having a gap through which said food engagement member may pass with said discrete food particle engaged thereon.

31. A method for feeding frogs cultivated in captivity, comprising the steps of:

(a) providing a feed source isolated from the frogs and including artificial feed having therein discrete particles of artificial feed; and, (b) transferring a discrete particle of artificial feed from the feed source to the frogs within sight of the frogs to a position within grasp of the frogs.

32. A method as defined in claim 31 further including the step of repeating the transferring step after said discrete particle of artificial feed is taken by a frog.

33. A method as defined in claim 31, further including the step of separating the frogs by developmental stages of the frogs or sizes of the frogs, and the step of providing artificial feed particles includes the step of providing discrete particles of artificial feed at a size and amount nutritionally adequate for the frogs cultivated of a selected size or developmental stage.

34. A method as defined in claim 31 wherein said transferring step includes simultaneously transferring a plurality of discrete particles of artificial feed.

35. A method as defined in claim 34 further including the step of repeating the simultaneously transferring a plurality of discrete particles of artificial feed after said frogs take the discrete particles of artificial feed.

\* \* \* \* \*